(12) United States Patent
Maeshima et al.

(10) Patent No.: US 6,486,923 B1
(45) Date of Patent: Nov. 26, 2002

(54) COLOR PICTURE DISPLAY APPARATUS USING HUE MODIFICATION TO IMPROVE PICTURE QUALITY

(75) Inventors: Kazuya Maeshima, Tokyo (JP); Zenichiro Hara, Tokyo (JP); Takashi Okamoto, Tokyo (JP); Shinya Iio, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/477,364

(22) Filed: Jan. 4, 2000

(30) Foreign Application Priority Data

Mar. 26, 1999 (JP) .............................. 11-083266

(51) Int. Cl.[7] .......................... H04N 9/64; H04N 9/67; H04N 9/30; H04N 5/70; G09G 3/32

(52) U.S. Cl. ...................... 348/649; 348/801; 348/806; 348/660; 348/661; 348/802; 348/659; 345/83; 345/82; 345/589; 345/590; 345/591

(58) Field of Search ................................ 348/801, 802, 348/806, 649, 725, 659, 661, 660; 345/83, 82, 589, 590–1; H04N 9/67, 9/68, 9/64

(56) References Cited

U.S. PATENT DOCUMENTS

| 4,298,868 A | * | 11/1981 | Spurgeon ..................... 340/755 |
| 4,445,132 A | * | 4/1984 | Ichikawa et al. .............. 357/32 |
| 4,679,072 A | * | 7/1987 | Takayama ..................... 358/80 |
| 4,694,330 A | * | 9/1987 | Tanaka et al. ................ 358/27 |
| 5,121,476 A | * | 6/1992 | Yee ............................... 395/154 |
| 5,235,413 A | * | 8/1993 | Knierim ........................ 358/37 |
| 5,258,829 A | * | 11/1993 | Matsunaga et al. ........... 358/30 |
| 5,452,093 A | * | 9/1995 | Kwak .......................... 358/296 |
| 5,461,429 A | * | 10/1995 | Konishi et al. .............. 348/656 |
| 5,677,741 A | * | 10/1997 | Yui .............................. 348/649 |
| 6,025,885 A | * | 2/2000 | Deter .......................... 348/661 |
| 6,144,352 A | * | 11/2000 | Matsuda et al. .............. 345/83 |
| 6,211,917 B1 | * | 4/2001 | Shyu .......................... 348/453 |
| 6,297,851 B1 | * | 10/2001 | Taubman et al. ........... 348/572 |
| 6,369,860 B1 | * | 4/2002 | Into ............................. 348/659 |

FOREIGN PATENT DOCUMENTS

| JP | 48 87975 | 10/1973 |
| JP | 50 74932 | 6/1975 |
| JP | 6-111736 | 4/1994 |
| JP | 08317414 A | 11/1996 |
| JP | 11032347 A | 2/1999 |

* cited by examiner

Primary Examiner—John Miller
Assistant Examiner—Paulos M. Natnael
(74) Attorney, Agent, or Firm—Birch, Stewart, Kolasch, Birch, LLP (57) ABSTRACT

A color picture display apparatus employs an array of light-emitting diodes or other light-emitting elements emitting different colors. A television signal is converted to monochromatic signals of the different colors. A color converter modifies the monochromatic signals, thereby changing the displayed hues to match the hues that would be displayed on a television screen, to compensate for ambient lighting conditions, or to achieve other desired effects. If each picture element has only a single light-emitting element, the modification preferably avoids unlit gaps in monochromatic areas of the displayed picture.

16 Claims, 9 Drawing Sheets

COLOR PICTURE DISPLAY APPARATUS USING HUE MODIFICATION TO IMPROVE PICTURE QUALITY

BACKGROUND OF THE INVENTION

The present invention relates to a color picture display apparatus employing an array of light-emitting elements such as light-emitting diodes (LEDs).

LED panels are used as components of, for example, large outdoor screens on which color television pictures and other color pictures are displayed. A single picture element or pixel may consist of a single red, green, or blue LED, or of a group of three or more LEDs of these primary colors. The LEDs of different colors are arranged in a regular pattern, but are not necessarily present in equal numbers. One known type of display apparatus, for example, achieves enhanced resolution by employing a one-LED-per-pixel array with extra green pixels, taking advantage of the fact that the human visual system is most sensitive to green light.

A problem encountered in LED-panel display apparatus is that the colors emitted by red, green, and blue LEDs differ from the colors emitted by the red, green, and blue phosphors employed in a conventional television picture tube or cathode-ray tube (CRT). An LED panel can display a wider range of colors than can a CRT. Consequently, when a standard television picture is displayed by apparatus employing LED panels, the picture has an unnaturally gaudy appearance.

Another problem is that individual LEDs, particularly green LEDs, vary in their spectral emission characteristics. These variations lead to erratic color rendition, which can degrade picture quality fairly seriously. The variations can be reduced by screening the LEDs and selecting LEDs with uniform characteristics for each primary color, but the screening process increases the cost of the apparatus. A conceivable alternative is to compensate for the individual LED differences, but while it is fairly easy to compensate for luminance variability, but it is generally difficult to compensate for spectral variability, i.e., color variability.

In a one-LED-per-pixel display, a further problem occurs due to the physical separation between pixels of the same primary color. If a nearly monochromatic red or blue picture is displayed, for example, the picture has a grainy appearance because of the mutual separation of the red or blue pixels. This is especially true in the above-mentioned apparatus with extra green pixels, because the red and blue pixels have to be widely separated to accommodate the increased number of green pixels.

LEDs are not the only light-emitting elements used in large-screen display apparatus. A large screen can be constructed from an array of CRTs, for example, in which case the light-emitting elements are phosphor dots. It would be desirable to solve the problems described above in a way that would be applicable to screens with any type of light-emitting elements.

SUMMARY OF THE INVENTION

An object of the present invention is to provide a color picture display apparatus having signal-processing circuitry capable of generating a natural picture appearance with any type of light-emitting elements.

Another object of the invention is to reduce the degree of picture degradation caused by variations in the spectral emission characteristics of the light-emitting elements.

A further object is to avoid a grainy picture appearance.

The invented color picture display apparatus comprises means for converting a color television signal to a plurality of monochromatic digital signals, means for modifying the monochromatic digital signals so as to obtain desired hues, and means for displaying a color picture according to the modified monochromatic digital signals by use of a regular array of light-emitting elements, each emitting light of a color corresponding to one of the monochromatic signals. The emitted colors are, for example, red, green, and blue.

The monochromatic signals are modified by, for example, a matrix multiplication operation using externally programmable coefficients.

If the light-emitting elements are LEDs, and if the monochromatic signals are sampled at different timings, corresponding to the positions of the LEDs in the array, so that each LED constitutes a separate picture element in the picture, then the array preferably has a comparatively large number of long-wavelength LEDs, or red LEDs.

DETAILED DESCRIPTION OF THE INVENTION

An embodiment of the invention will be described with reference to the attached drawings, in which like parts are indicated by like reference characters.

Figure 1:
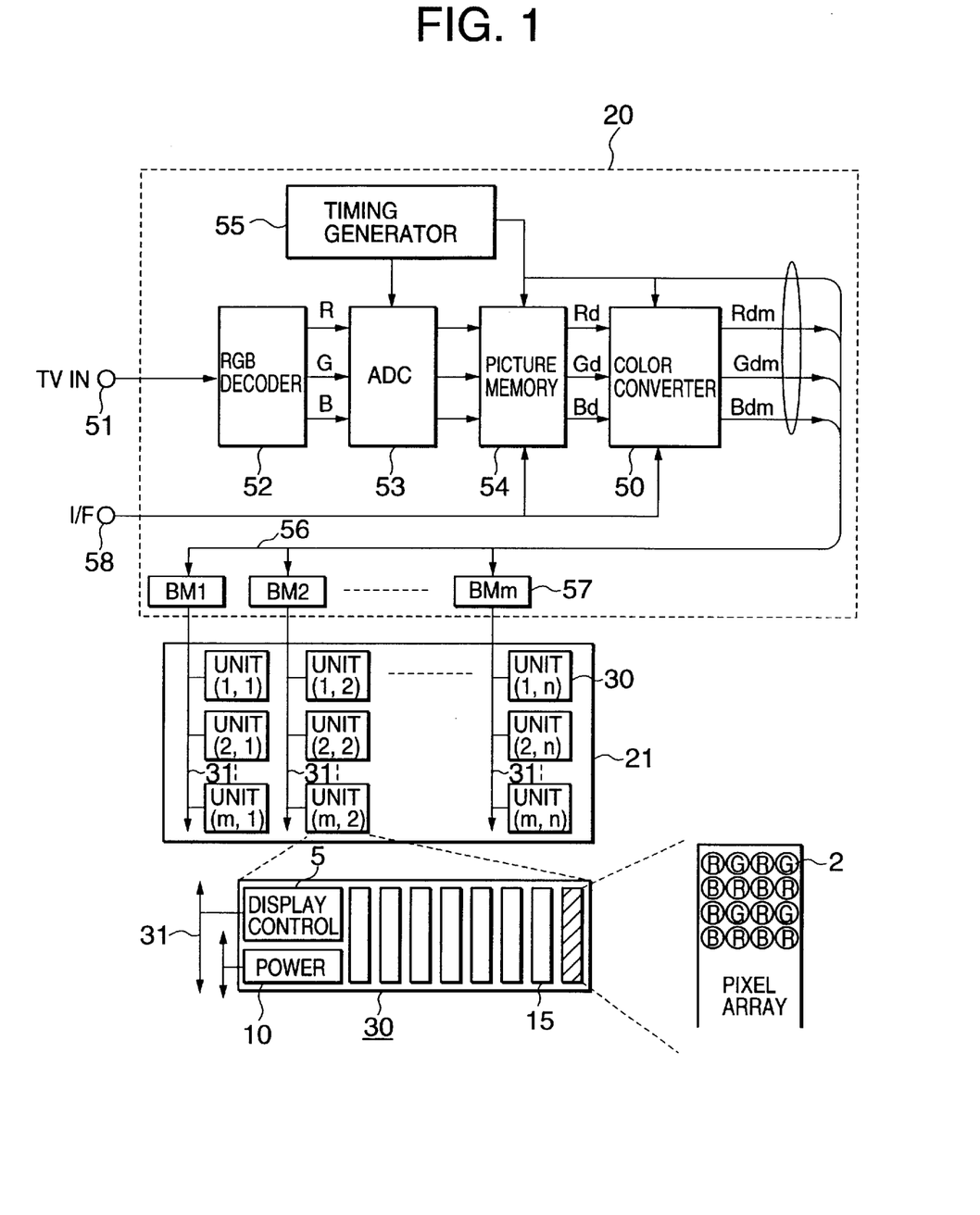
FIG. 1 is a block diagram of a color picture display apparatus embodying the present invention.

Referring to FIG. 1, the embodiment is a color picture display apparatus comprising signal-processing circuitry 20 and a screen 21. The screen 21 comprises an m-by-n array of display units 30, where m and n are positive integers that depend on the size of the screen. The display units 30 are linked by data transmission lines 31. Each display unit 30 comprises a display control circuit 5, a power supply 10, and a plurality of pixel arrays 15. Each pixel array 15 has a matrix of red (R), green (G), and blue (B) LEDs arranged in a regular pattern, with twice as many red LEDs as green or blue LEDs. This arrangement will be referred to below as an RRGB arrangement. Each LED functions as a separate pixel 2 in the pixel array 15.

The signal-processing circuitry 20 comprises an input terminal 51 receiving an analog color television signal, an RGB decoder 52 that decodes the television signal to obtain red (R), green (G), and blue (B) monochromatic signals, and an analog-to-digital converter (ADC) 53 that samples the monochromatic signals and converts them to digital signals, referred to below as picture data. The sampling rate depends on the number of pixels 2 on the screen 21. Each sample is converted to a certain number of bits, which are stored temporarily in a picture memory 54. The ADC 53 and picture memory 54 operate according to timing signals supplied by a timing generator 55. The timing generator 55 supplies the ADC 53 with separate sampling timing signals for each of the three monochromatic signals R, G, and B. The sampling timing of each signal is matched to the positions of the corresponding pixels 2 in the display unit 30, so that in one horizontal line, the R and G signals are sampled alternately, while in the next line, the B and R signals are sampled alternately.

The picture data Rd, Gd, Bd are read from the picture memory 54 by a novel color converter 50, which converts the picture data to modified picture data Rdm, Gdm, Bdm. The modified picture data are transferred over a picture data bus 56 to a plurality of buffer memories 57, together with a clock signal and other timing signals supplied by the timing generator 55. The number of buffer memories is equal to the number (m) of columns of display units 30; in the drawing, the buffer memories are identified as BM1 to BMm. The signal-processing circuitry 20 also has a computer interface (I/F) 58, through which picture data can be written into the picture memory 54, and coefficient data can be written into the color converter 50.

Each buffer memory 57 supplies modified picture data to one column of display units 30 via one data transmission line 31. The data transfer rate on each data transmission line 31 is lower than the data transfer rate on the picture data bus 56; the function of the buffer memory 57 is to convert between the two rates. The data transmission lines 31 also carry timing signals. The display control circuits 5 in the display units 30 use the timing signals to convert the modified picture data to driving signals that drive the pixel arrays 15. The pixels 2 emit light, forming a single picture that covers the entire screen 21. Each pixel is driven according to the red, green, or blue sample value at the corresponding point in the picture received at the input terminal 51 or computer interface terminal 58.

Figure 2:
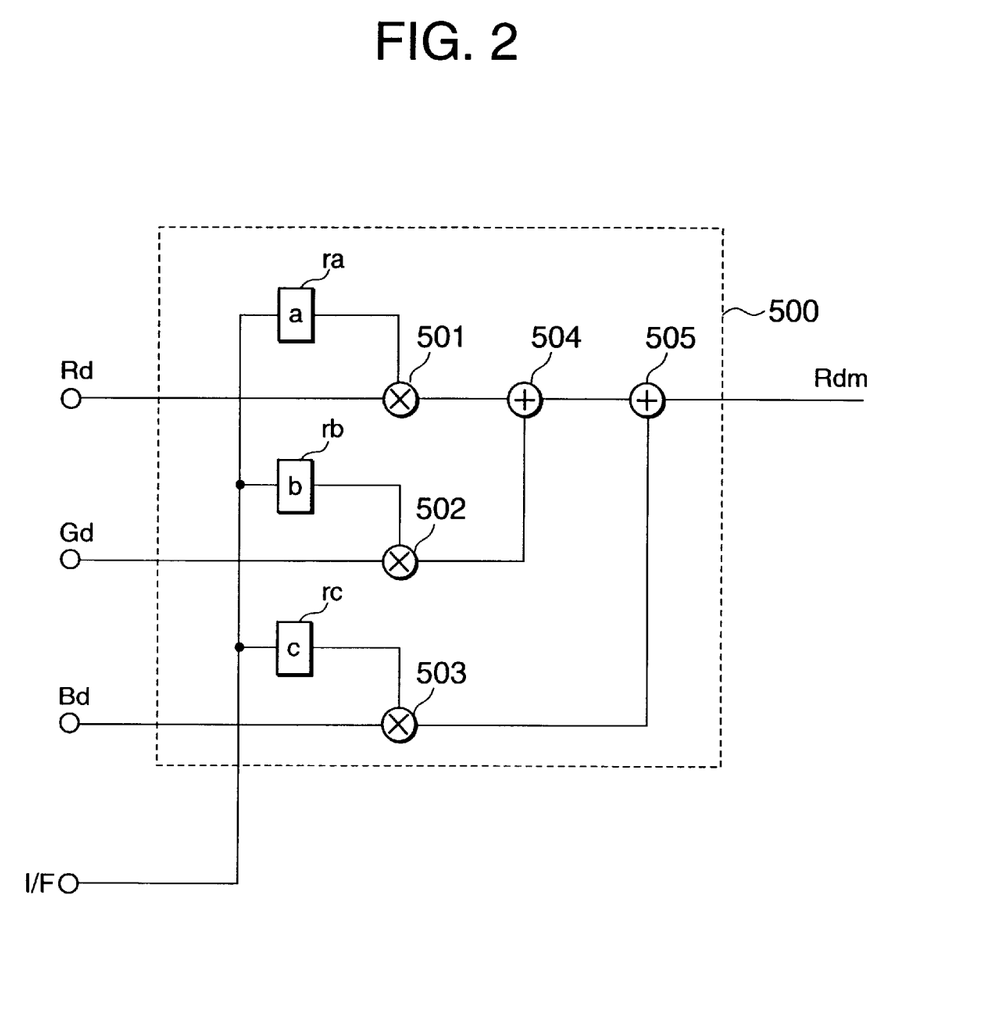
FIG. 2 is a more detailed block diagram showing part of the color converter in FIG. 1.

FIG. 2 illustrates the internal structure of the color converter 50, showing the circuits 500 that generate the modified red data Rdm. These circuits 500 include three registers ra, rb, rc that output coefficients a, b, c, respectively, a multiplier 501 that multiplies the red data Rd by coefficient a, a multiplier 502 that multiplies the green data Gd by coefficient b, a multiplier 503 that multiplies the blue data Bd by coefficient c, and adders 504, 505 that sum the outputs of the three multipliers 501, 502, 503 to obtain the modified red data Rdm. The coefficients a, b, c are written into registers ra, rb, rc through the computer interface 58.

The circuits that generate the modified green data Gdm and modified blue data Bdm have similar configurations, with different coefficients (d, e, f, g, h, i). The operation performed by the color converter 50 can be expressed in matrix notation as follows.

$$\begin{pmatrix} Rdm \\ Gdm \\ Bdm \end{pmatrix} = \begin{pmatrix} a & b & c \\ d & e & f \\ g & h & i \end{pmatrix} \times \begin{pmatrix} Rd \\ Gd \\ Bd \end{pmatrix}$$

Figure 3:
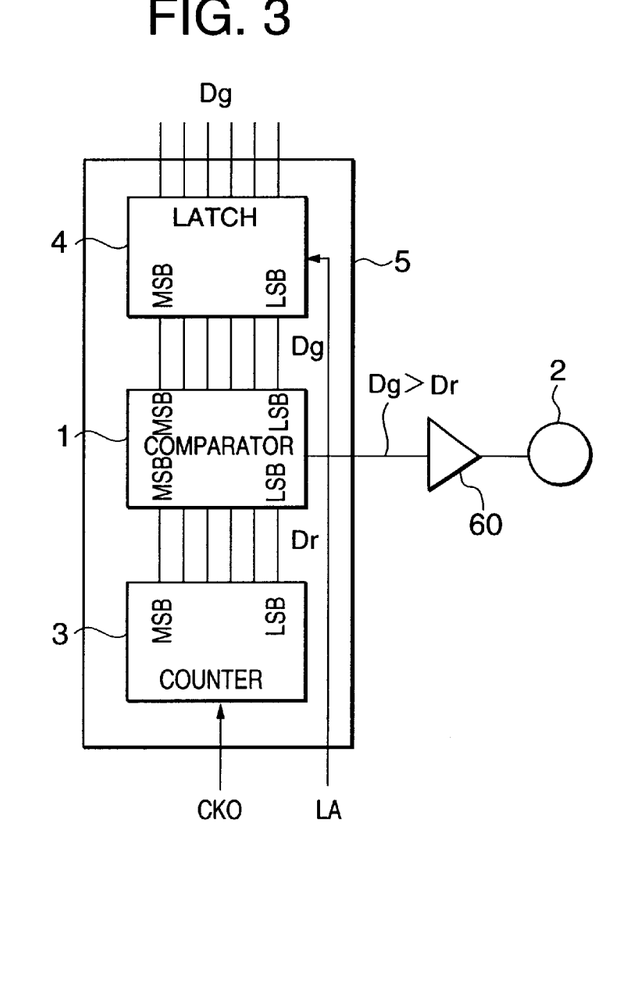
FIG. 3 is a more detailed block diagram showing the circuits for driving one light-emitting element in FIG. 1.

FIG. 3 shows the circuits for driving one pixel 2. In the display control circuit 5, the pixel value Dg is latched in a multiple-bit latch 4 at regular intervals specified by a latch signal LA. In this example, the pixel data are six-bit data; MSB indicates the most significant bit, and LSB the least significant bit. A counter 3 counts pulses of a clock signal CKO, making one complete counting cycle per field of the displayed picture. In this example, the counter 3 is a six-bit counter, and the clock frequency is sixty-four ($2^6$) times the field frequency. The latch signal LA and clock signal CKO are timing signals supplied from the data transmission line 31. A comparator 1 compares the counter output Dr with the pixel value Dg, generating an output signal that is active when Dg exceeds Dr (Dg>Dr), and inactive when Dg does not exceed Dr (Dg≦Dr). A driver 60, which was omitted in FIG. 1, supplies driving current to the pixel 2 when the output signal from the comparator 1 is active.

Figure 4:
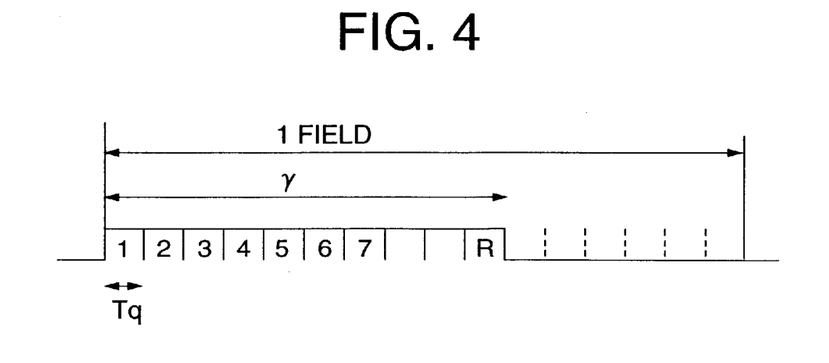
FIG. 4 is a waveform diagram illustrating the driving of a light-emitting element.

FIG. 4 illustrates the driving of a pixel 2 by showing a waveform of the output of the comparator 1 during one field. The symbol Tg represents the CKO clock period. If the pixel value Dg is a positive integer R, the comparator output is active (high) for the first R clock periods of the field, having a duration γ. As long as Dg remains unchanged, this waveform is repeated in every field. The driving scheme is thus a pulse-width modulation (PWM) scheme providing sixty-four brightness levels.

Figure 5:
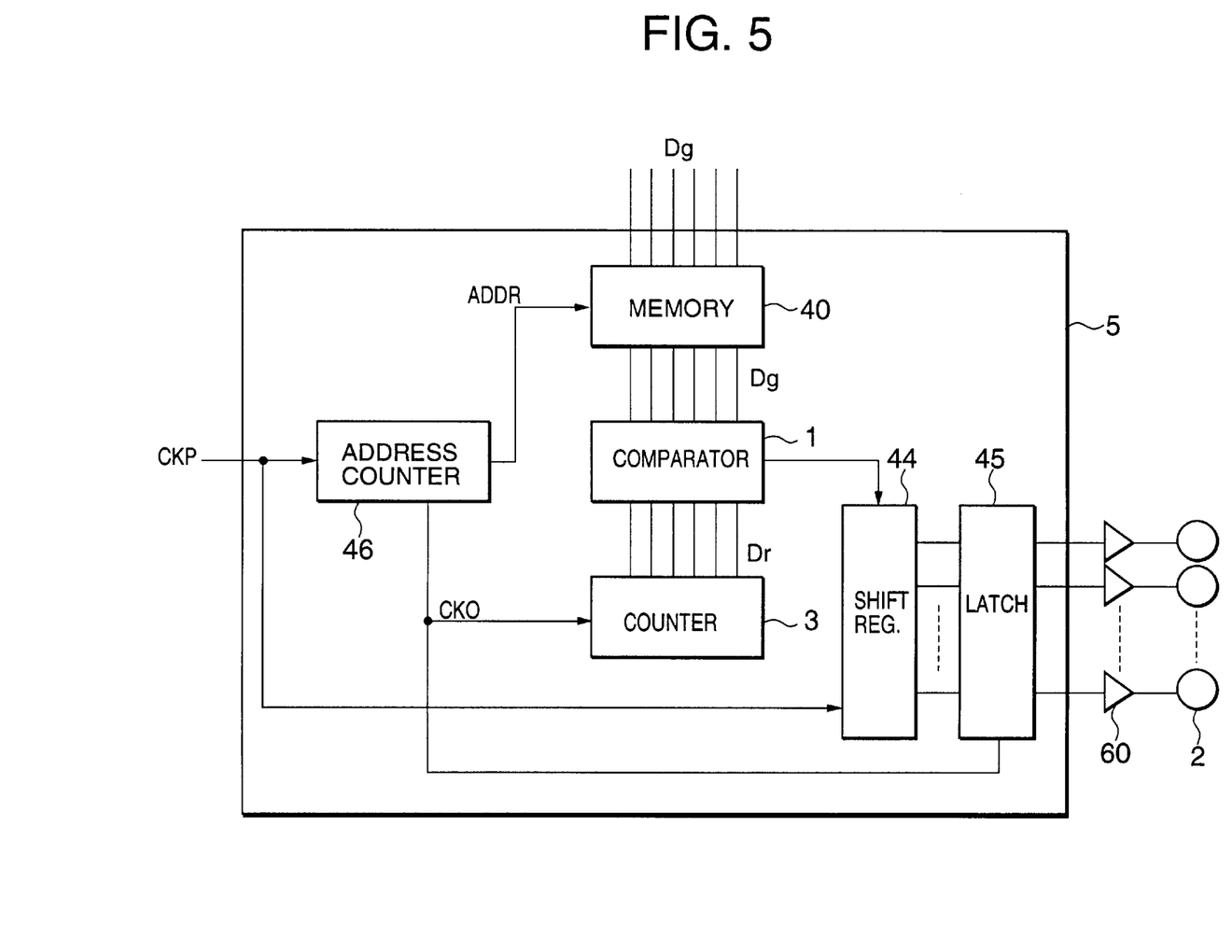
FIG. 5 shows a variation of the circuits in FIG. 3.

FIG. 5 shows a variation of the display control circuit 5a in which the pixel values Dg of all driven pixels are stored in a memory 40. A separate memory 40 is provided for each display unit 30. During each cycle of the clock signal CKO, the entire contents of the memory 40 are compared with the single count value Dr output by the counter 3, and the results Dp are shifted into a shift register 44. At the end of the CKO clock cycle, the contents of the shift register 44 are latched in a parallel set of latches 45, for output to the drivers 60 during the next CKO clock cycle. Read addresses ADDR are generated by an address counter 46 and supplied to the memory 40. The address counter 46 counts cycles of a clock signal CKP having a frequency P times higher than the CKO frequency, where P is the number of pixels 2 driven by the display control circuit 5a. The address counter 46 is a modulo-P counter; a pulse of the clock signal CKO is generated each time the address returns from (P−1) to zero. Because this display control circuit 5a uses the same comparator 1 for all P pixels, it requires less circuitry than the display control circuit 5 in FIG. 3.

Next, the operation of this picture display apparatus will be described.

Before picture display begins, an external computing device (not shown) writes or programs coefficient values (a to i) in the registers of the color converter 50. The coefficients transform picture data Rd, Gd, Bd suitable for reproduction on a CRT screen to modified picture data Rdm, Gdm, Bdm that reproduce substantially the same colors with LEDs. The transformation can be illustrated geometrically as follows.

Figure 6:
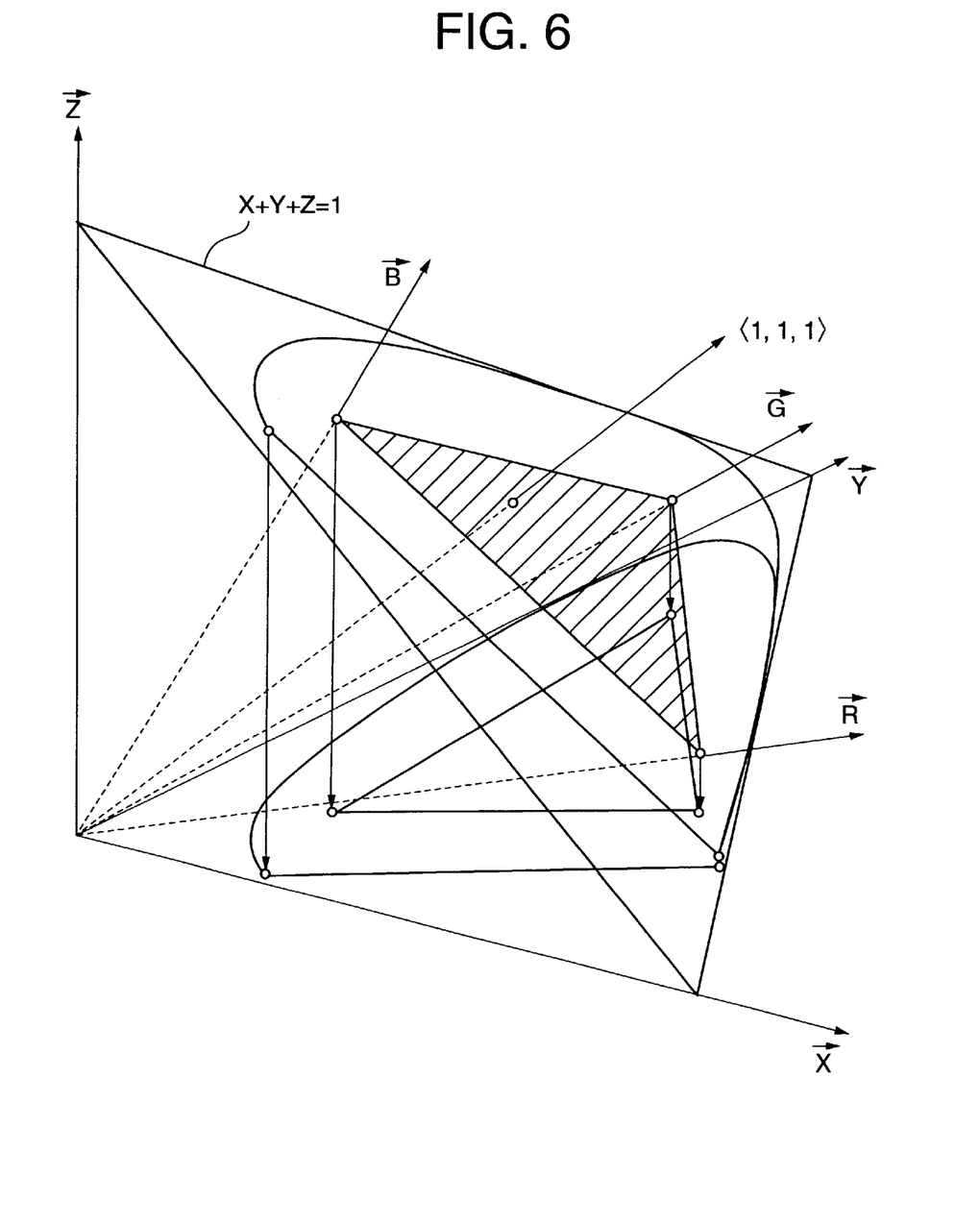
FIG. 6 illustrates a projection of a three-dimensional color coordinate system onto a two-dimensional chromaticity diagram.

FIG. 6 shows a color coordinate system defined by vectors X, Y, Z as in the CIE standard observer system. (CIE stands for the International Commission on Illumination, or Commission Internationale de l'Eclairage.) Vectors R, G, and B indicate the colors of light emitted by the red, green, and blue LEDs employed in the screen 21. The hatched triangle represents the gamut of reproducible colors in the plane defined by the equation $$X+Y+Z=1.$$

The curve surrounding this triangle in the same plane is the spectrum locus. Different points on this locus indicate different hues.

Figure 7:
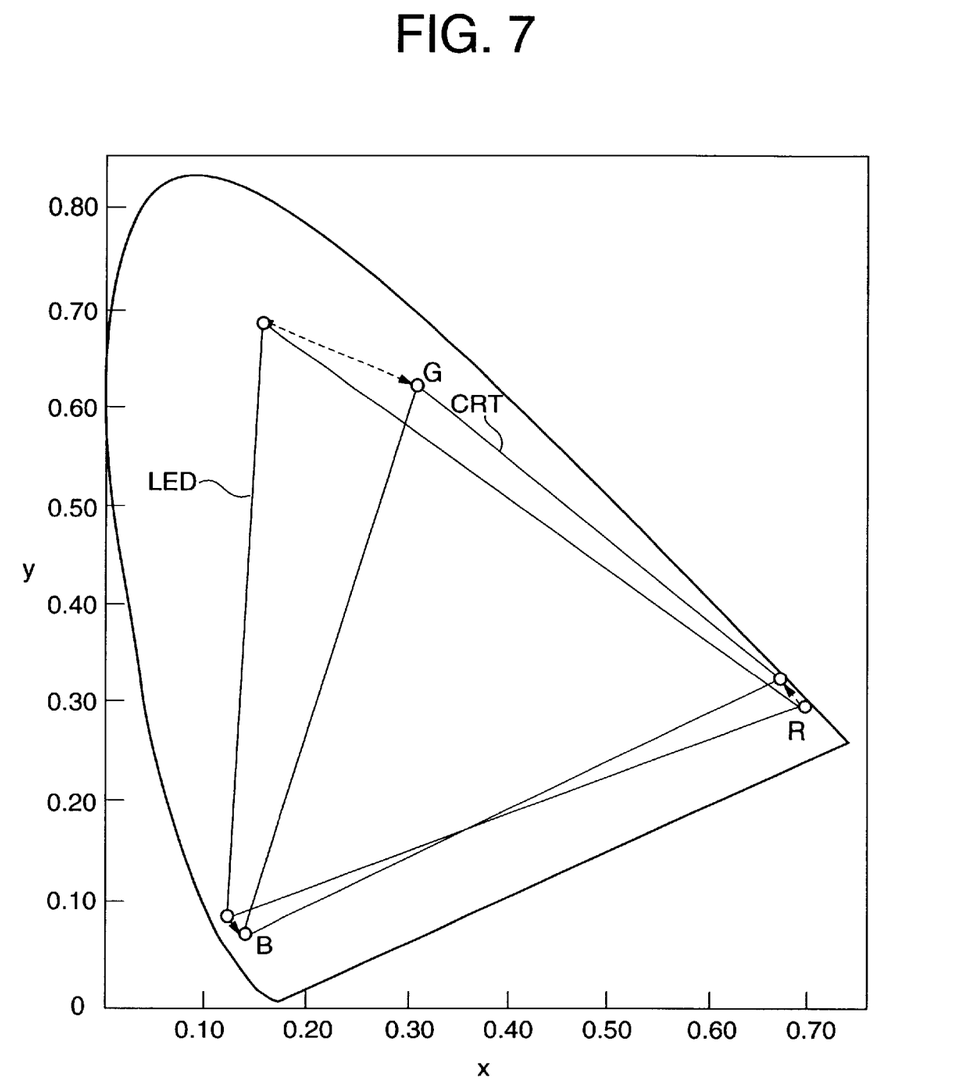
FIG. 7 illustrates the colors reproducible by LED and CRT display apparatus.

The spectrum locus and the gamut of reproducible colors can be projected onto the X-Y plane as indicated by the vertical arrows in FIG. 6 to obtain the chromaticity diagram shown in FIG. 7. The chromaticity coordinates are conventionally denoted by lower-case letters x and y. The triangles labeled LED and CRT illustrate the gamut of colors reproducible on an LED display screen, and the gamut of colors reproducible on a CRT display screen.

Ideally, the coefficients written in the color converter 50 effect the transformation indicated by the arrows in FIG. 7, so that colors are rendered on the LED screen 20 exactly as they would be on a CRT screen. In practice, this transformation is not quite feasible, because the colors generated by the red, green, and blue phosphors on CRT screens lie slightly outside the gamut of colors reproducible on an LED screen. The red, green, and blue primaries are therefore transformed from the vertices of the LED triangle to points that lie within both the LED and CRT triangles. Pure green is rendered as a mixture of green and red. Pure red is rendered as red with a slight admixture of green. Pure blue is rendered as blue with a slight admixture of red.

By modifying the hues of the displayed colors, this transformation causes substantially the same hues to be reproduced on the LED screen 21 as would be reproduced on a CRT screen. A further consequence is that the red LEDs are driven when any color is reproduced, other than black.

The modified picture data are supplied through the buffer memories 57 to the display control circuits 5 in the display units 30, and the picture is displayed on the screen 21. Since the sampling of the R, G, and B analog signals in the signal-processing circuitry 20 matches the separate positions of the red, green, and blue pixels on the screen 21, a comparatively high resolution is obtained. Moreover, since the red LEDs are driven even when the picture is purely green or blue, the grainy effect caused by the comparatively wide separation of the green and blue pixels 2 is avoided.

If the displayed picture has a purely green area, for example, the transformation performed by the color converter 50 adds enough red light to fill in the spaces between the green pixels, avoiding the appearance of discrete green dots. The human visual system integrates the red and green light to perceive a shade of green similar to that perceived on a CRT screen. Similarly, the spaces between the blue pixels in a blue picture area are filled in with a certain amount of red light, and the spaces between the red pixels in a red picture area are filled in with a certain amount of green light, avoiding graininess in both cases.

As a variation of the operation described above, the coefficient values (a to i) written into the color converter 50 can be selected to optimize the overall quality of the picture, balancing the factors of graininess, resolution, and accurate color rendition. In particular, the coefficients can be chosen so that every color is rendered as a mixture of all three primary colors. Then all pixels are always driven, and no black gaps are left in the picture, except when black is displayed intentionally. Although the displayed colors are altered somewhat, a striking improvement in picture quality can be obtained in this way.

The coefficient values can also be selected to compensate for ambient lighting conditions. If desired, the coefficients can furthermore be altered when computer-generated graphics, supplied through the computer interface 58, are displayed instead of a television picture. A wide variety of effects can be achieved.

Figure 8:
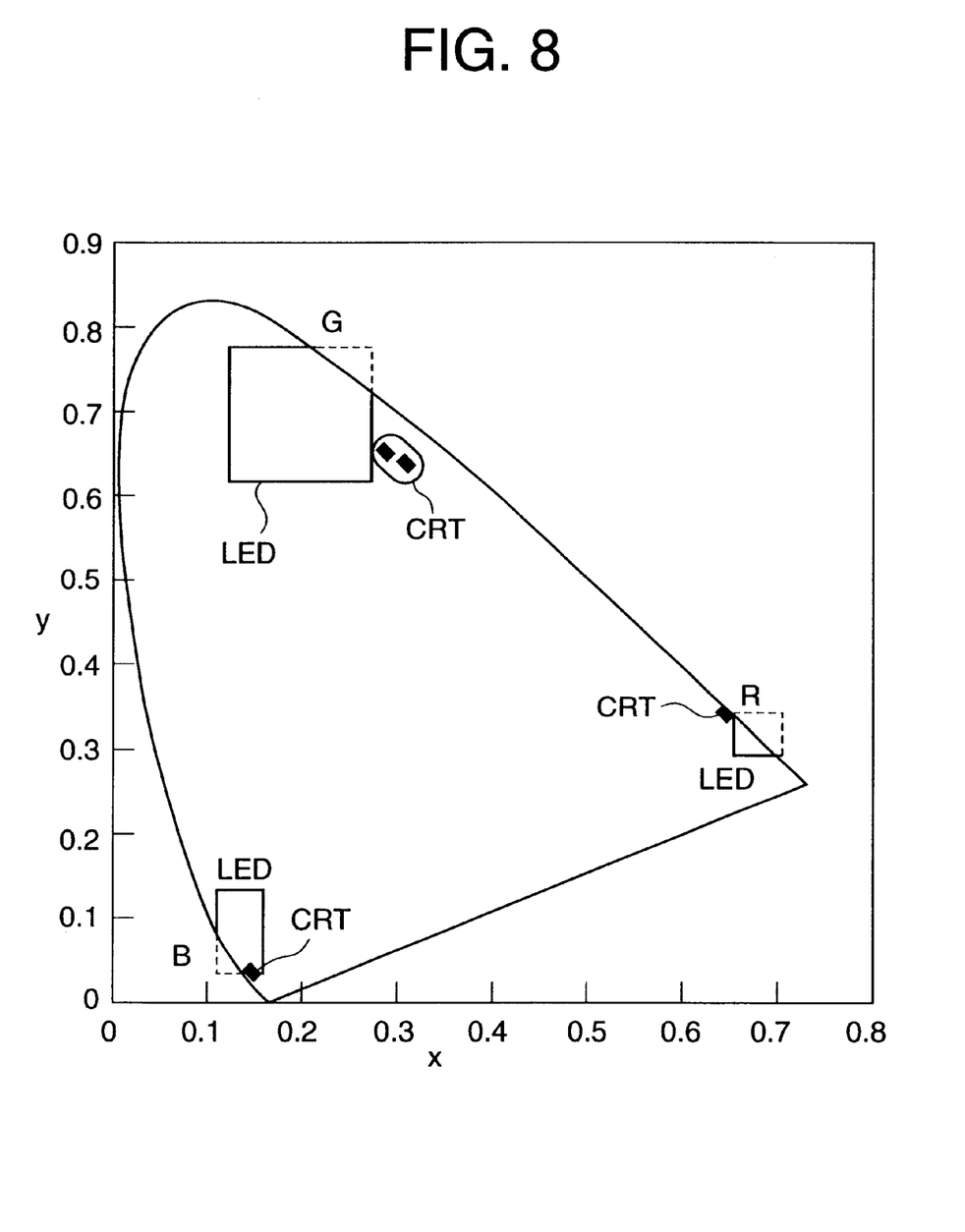
FIG. 8 illustrates the ranges of variation of the primary colors in LED and CRT display apparatus.

A further effect of the invention is that picture degradation due to variations in LED spectral emission characteristics is reduced without the need for screening of the LEDs. FIG. 8 shows the spectral variability of LEDs and CRT phosphors on a chromaticity diagram. Although the variability of all three types of LEDs is greater than the variability of the corresponding CRT phosphors, the variability of green LEDs is particularly large, and red LEDs have the least variability. The increased number of red LEDs in the RRGB pixel arrangement thus has the effect of improving the uniformity of color rendition.

Figure 9:
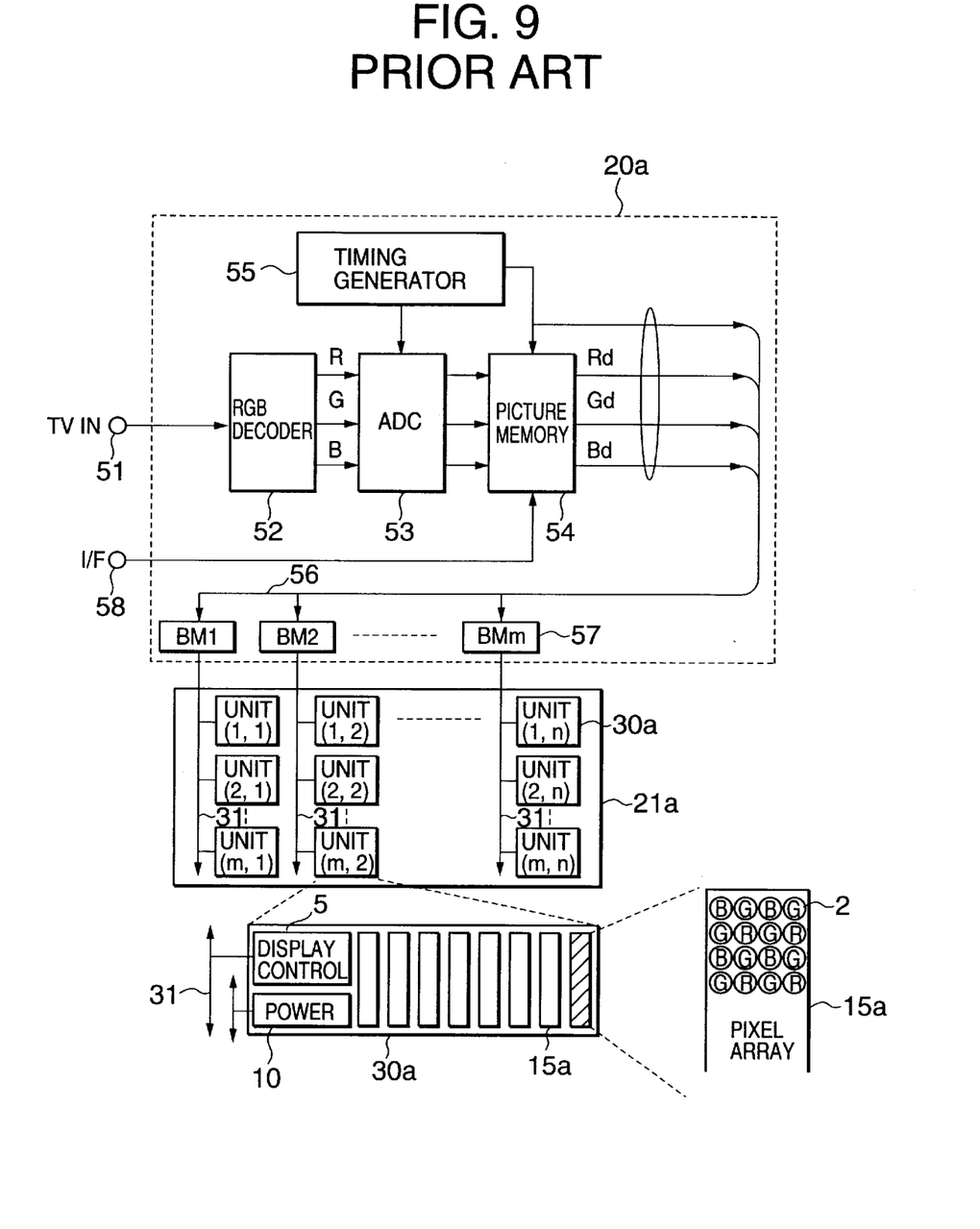
FIG. 9 is a block diagram of a color picture display apparatus illustrating the prior art.

For comparison, FIG. 9 shows a block diagram of a color picture display apparatus lacking the color converter 50 and having an RGGB pixel arrangement, as found in the prior art. The same reference numerals are used as in FIG. 1, with a suffix 'a' added to designate differing elements. The screen 21a and display units 30a have the structure described above, except for the RGGB arrangement in the pixel arrays 15a. The signal-processing circuitry 20a has the structure described above, except that the data read from the picture memory 54 are supplied directly to the buffer memories 57. In this apparatus, the large number of green pixels exaggerates the picture degradation caused by the spectral variability of the green LEDs. Red and blue picture areas are also degraded by graininess, due to the wide separation between blue and red pixels, so substantially all picture areas are degraded in one way or another.

Figure 10A:
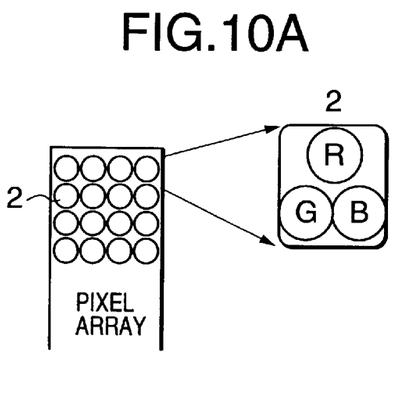
FIGS. 10A, 10B, and 10C illustrate variations of the pixel arrangement in FIG. 1.
Figure 10B:
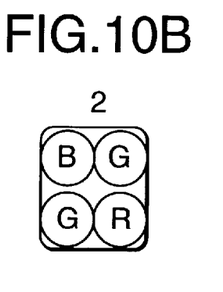
Figure 10C:
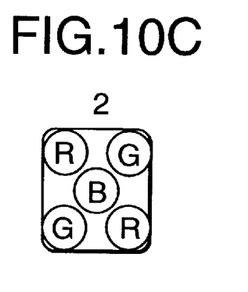
Figure 11A:
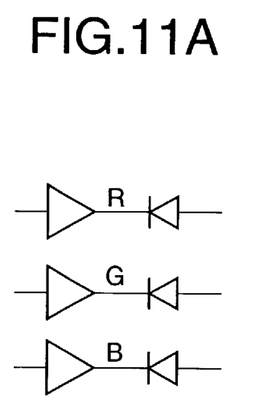
FIGS. 11A, 11B, and 11C illustrate driving circuits for the above variations.
Figure 11B:
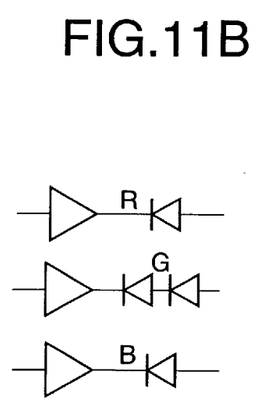
Figure 11C:
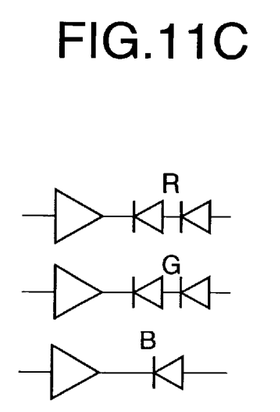

The embodiment described above has one LED per pixel, but the invention can also be practiced in a color picture display apparatus with more than one LED per pixel. FIGS. 10A, 10B, and 10C show examples of pixel arrays in which each pixel 2 comprises three, four, and five LEDs, respectively. Each pixel 2 comprises at least one LED of each of the three primary colors, and can generate any color obtainable by a combination of the three primaries. FIGS. 11A, 11B, and 11C show examples of circuits for driving these pixels. In these examples, the R, G, and B signals are sampled at the same timings in the signal-processing circuitry 20, so a larger number of LEDs is required to achieve a given resolution.

In FIGS. 10B and 11B, each pixel has two green LEDs, but both green LEDs are driven according to the same modified value Gdm, so the variability of the two green LEDs tends to average out, reducing the perceived variation. This differs from the prior art in FIG. 9, in which each green LED is driven individually.

The invention has been described in relation to a screen 21 employing LEDs, but the invention can be practiced with other types of light-emitting elements. The same signal-processing circuitry 20 can be used with any type of screen, because the color converter 50 can be externally programmed with coefficients that compensate for the spectral characteristics of any type of light-emitting elements.

Even if the screen comprises an array of CRTs, the color converter 50 is still useful in compensating for ambient conditions and achieving special effects.

If the apparatus is always used under similar conditions and special effects are not needed, then the coefficients can be stored permanently in the color converter 50, instead of being externally programmed through the computer interface 58.

Depending on the type of LEDs or other light-emitting elements employed, the RRGB pattern shown in FIG. 1 can be modified to another pattern in which less variable, longer-wavelength light-emitting elements are more numerous than more-variable, shorter-wavelength light-emitting elements.

As described above, the invention provides a color picture display apparatus with highly flexible signal-processing circuitry, capable of good color rendition under any conditions, with a screen having any type of light-emitting elements. In an apparatus in which each pixel has only one light-emitting element and the different color signals are sampled at different timings, matching the positions of pixels of corresponding colors on the screen, the invention improves the perceived picture quality by rendering all colors as combinations of light from light-emitting elements of at least two different colors, thereby reducing picture noise and avoiding a grainy appearance.

In an apparatus employing LEDs, the invention further improves the perceived picture quality by employing a larger number of longer-wavelength LEDs, specifically red LEDs, which are less variable in their spectral characteristics than shorter-wavelength LEDs, and thus provide more accurate color rendition.

Several variations of the above embodiment have already been described, but those skilled in the art will recognize that still further variations are possible within the scope claimed below.

What is claimed is:

1. A color picture display apparatus, comprising:

first conversion means converting a color television signal to a plurality of monochromatic digital signals representing different colors;

second conversion means coupled to said first conversion means, converting said monochromatic digital signals to modified monochromatic digital signals representing desired hues; and display means coupled to said second conversion means, displaying a color picture according to said modified monochromatic digital signals, said display-means having a plurality of light-emitting elements disposed in a regular array, each one of said light-emitting elements emitting one of said different colors, wherein substantially all said light-emitting elements emitting one color emit said color when any color is reproduced, other than black, wherein a comparatively large number of said light-emitting elements emit comparatively long-wavelength light.

2. The color picture display apparatus of claim 1, wherein said second conversion means performs a matrix multiplication operation on said monochromatic digital signals.

3. The color picture display apparatus of claim 1, wherein said second conversion means operates according to externally programmable coefficients.

4. The color picture display apparatus of claim 1, wherein said monochromatic digital signals are sampled in said first conversion means at different timings, corresponding to positions of the individual light-emitting elements in said display means.

5. The color picture display apparatus of claim 4, wherein said light-emitting elements are light-emitting diodes.

6. The color picture display apparatus of claim 5, wherein said different colors are red, green, and blue, said display means having more light-emitting diodes emitting red light than light-emitting diodes emitting green light, and more light-emitting diodes emitting red light than light-emitting diodes emitting blue light.

7. The color picture display apparatus of claim 1, wherein substantially all red light-emitting elements are driven when any color is reproduced, other than black.

8. The color picture display apparatus of claim 1, wherein said each one of said light-emitting elements is controlled according to picture data sampled at a different timing.

9. A method of displaying a color picture, comprising the steps of:

(a) converting a color television signal to a plurality of monochromatic digital signals representing different colors;

(b) converting said monochromatic digital signals to modified monochromatic digital signals representing desired hues; and (c) controlling a regular array of light-emitting elements according to said modified monochromatic digital signals, each one of said light-emitting elements emitting one of said different colors, wherein substantially all said light-emitting elements emitting one color emit said color when any color is reproduced, other than black, wherein a comparatively large number of light-emitting elements emit comparatively long-wavelength light.

10. The method of claim 9, wherein said step (b) performs a matrix multiplication operation on said monochromatic digital signals.

11. The method of claim 9, wherein said step (b) uses externally programmable coefficients.

12. The method of claim 9, wherein said monochromatic digital signals are sampled in said step (a) at different timings, corresponding to positions of the individual light-emitting elements in said regular array.

13. The method of claim 12, wherein said light-emitting elements are light-emitting diodes.

14. The method of claim 13, wherein said different colors are red, green, and blue, said regular array having more light-emitting diodes emitting red light than light-emitting diodes emitting green light, and more light-emitting diodes emitting red light than light-emitting diodes emitting blue light.

15. The method of claim 9, wherein substantially all red light-emitting elements are driven when any color is reproduced, other than black.

16. The method of claim 9, wherein said each one of said light-emitting elements is controlled according to picture data sampled at a different timing.

* * * * *